United States Patent [19]

Nagel

[11] 4,064,490
[45] Dec. 20, 1977

[54] INFORMATION RETRIEVAL SYSTEM HAVING SELECTED PURPOSE VARIABLE FUNCTION TERMINAL

[76] Inventor: Robert H. Nagel, 10 Dubon Court, New York, N.Y. 11735

[21] Appl. No.: 611,927

[22] Filed: Sept. 10, 1975

[51] Int. Cl.² .............................................. G06F 3/04
[52] U.S. Cl. ..................................... 364/200; 358/141
[58] Field of Search ......................... 340/172.5; 445/1; 358/141

[56] References Cited

U.S. PATENT DOCUMENTS

| | | | |
|---|---|---|---|
| 3,593,316 | 7/1971 | Frieband et al. | 340/172.5 |
| 3,725,868 | 4/1973 | Malmer et al. | 340/172.5 |
| 3,760,171 | 9/1973 | Wang et al. | 340/172.5 |
| 3,760,375 | 9/1973 | Irwin et al. | 340/172.5 |
| 3,859,635 | 1/1975 | Watson et al. | 340/172.5 |
| 3,889,054 | 6/1975 | Nagel et al. | 178/6.8 |
| 3,906,457 | 9/1975 | Mattedi et al. | 340/172.5 |

*Primary Examiner*—Mark E. Nusbaum
*Attorney, Agent, or Firm*—Hubbell, Cohen, Stiefel & Gross

[57] ABSTRACT

An information retrievel system includes a video display terminal controlled by a local microcomputer which controls the major functions thereof and is connectable in a network with other such video display terminals which function as selected purpose variable function terminals by utilizing the instructions for the local microcomputer which come from a remote central data source as data so that the user can request a particular function, that is a program or set of instructions for the microcomputer as well as being able to request certain data from the data source. This set of instructions is transmitted over the same media as data and has the same format as the data, such as a pseudo video digital scan line when utilized with a row grabbing video display terminal transmitted over cable. The set of instructions is locally stored until erasure at the terminal, such as in a RAM, for locally controlling the functioning of the microcomputer. This program may be replaced or modified by requesting a different program to select a different purpose for the terminal. A ROM permanently stores the loader and executive program for the terminal and may normally operate the terminal as a row grabbing video display terminal except when a program is requested for selecting a different purpose for the terminal in which instance the called program or set of instructions is stored in the RAM and, when the entire requested program has been loaded, control is turned over from the ROM stored loader program to the newly entered called program which operates the terminal in accordance with the selected purpose. This RAM stored program may be erased to enable normal functioning as a row grabbing video display terminal if desired or may be replaced by a different selected program by depression of the appropriate keys on the keyboard. The system could be a one way communication system in which instance the data and programs are continuously transmitted in repetitive fashion from the remote data source including updated information in a real time environment or, if desired, could be implemented in a two way system.

21 Claims, 4 Drawing Figures

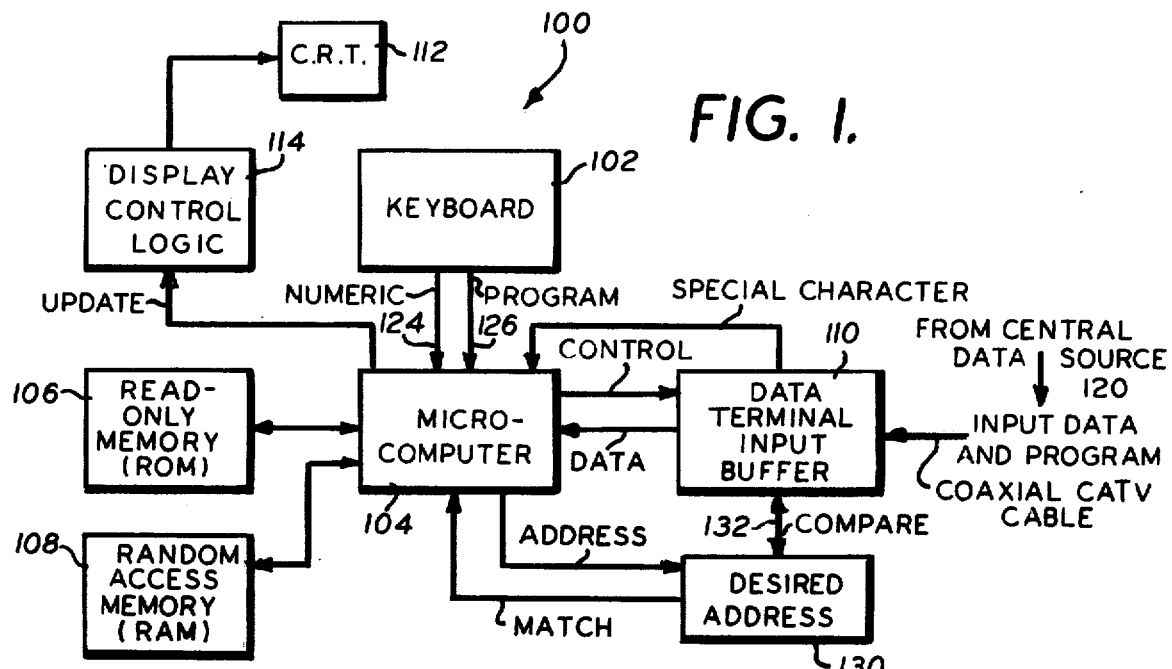
FIG. 1.
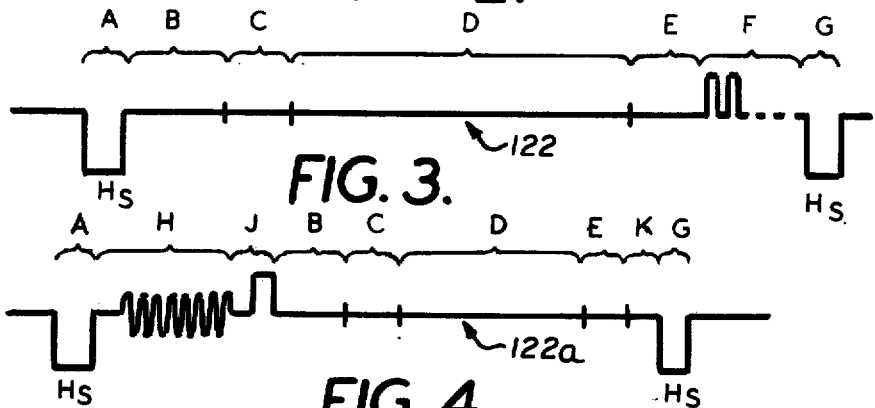
FIG. 2.
FIG. 3.
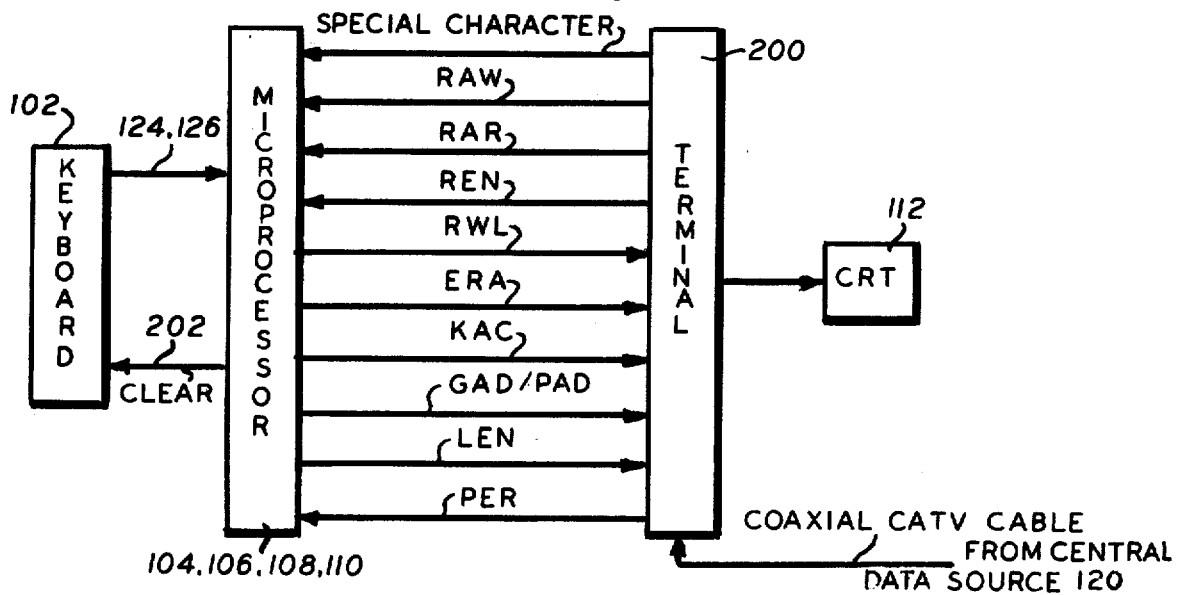
FIG. 4.

INFORMATION RETRIEVAL SYSTEM HAVING SELECTED PURPOSE VARIABLE FUNCTION TERMINAL

CROSS REFERENCE TO RELATED APPLICATIONS

This application is an improvement on the system described in my copending U.S. patent application entitled "Improved Row Grabbing System", filed concurrently herewith on Sept. 10, 1975 bearing U.S. Ser. No. 611,843 and on the row grabbing system described in my previously issued U.S. Pat. No. 3,889,054, issued June 10, 1975.

BACKGROUND OF THE INVENTION

1. Field of the Invention

The present invention relates to communication systems in which remotely stored programs may be grabbed for locally converting a microcomputer controlled terminal into a selected purpose variable function terminal whose selected function may be locally changed.

2. Description of the Prior Art

Computers and other types of programmable devices are well known in the data processing art and in the communications field in general. These prior art systems function in accordance with a stored set of instructions or programs or a series of programs, such as in a typical IBM Operating System or OS. In such systems, however, the programming is accomplished at the central computer whose function may be varied only by variation in the program which is loaded thereinto. Due to the high cost of computers, the art of time sharing has developed which, through teleprocessing, has enabled a plurality of users to share a common centrally located computer by use of remote input/output devices. However, such time sharing still requires the users to be bound by the particular program which is stored in the central computer so that the plurality of users essentially share the same program functions which process their individual data inputs in accordance therewith. There are presently no systems known to the inventor in which remote local terminals connected to a remote central data source can function in accordance with any one of a plurality of locally selected purposes or functions to provide a selected purpose variable function terminal in which the selected purpose or function may be locally varied electronically without the user having to actually reprogram his terminal. Furthermore, there are no such terminals known to the inventor in which a video communication system which enables the video display of information, such as over a CATV system, may also be converted to a local selected purpose variable function terminal in which desired control programs may be electronically called up or retrieved from a remote central processor for local storage and operation in accordance therewith. Such a video communication system in which individual frames may be grabbed for video display thereof and updated on a row-by-row basis is described in my previously issued U.S. Pat. No. 3,889,054, issued June 10, 1975, in which pseudo video digital data scan lines are transmitted continuously from a central data source in a one way communication system. Such a system may be controlled locally by a microcomputer as described in my copending U.S. patent application entitled "Improved Row Grabbing System", filed Sept. 10, 1975, bearing U.S. Ser. No. 611,843. As will be described herein, such video communication systems, as those employing a local microcomputer, have not been utilized to full advantage as a selected purpose variable function terminal in which processing of data in accordance with any desired selected function, which may be varied, can be accomplished as well as the display of video data therefrom. The present invention is an improvement on such systems so as to provide such a selected purpose variable function terminal.

SUMMARY OF THE INVENTION

An information retrieval system is provided which comprises a remote information source for remotely transmitting information in a predetermined format over a common predetermined transmission media and a local selectable purpose variable function terminal operatively connected to the remote information source via the common transmission media for selectively receiving the remotely transmitted information. The remotely transmitted information comprises displayable data, such as video displayable data or data displayable on any other type of display means, such as a printer, and a plurality of different sets of control instructions for the terminal. Each of the sets of control instructions corresponds to a different selectable purpose for the terminal. The terminal comprises microcomputer means for controlling the operation thereof, with the microcomputer means being operatively connected to the transmission media, such as coaxial television cable if the terminal is a video display terminal, for receiving the remotely transmitted information, the sets of control instructions comprising sets of control instructions for the microcomputer means. Selection means, such as a keyboard means, are operatively connected to the microcomputer means for variably selecting a first selectable purpose for the terminal from a plurality of different selectable purposes for the terminal, the selectable purposes being variable. Local storage means, such as a random access memory means, are provided for selectively retrievably locally storing either the remotely transmitted displayable data or a first one of the remotely transmitted selected set of control instructions for the microcomputer means corresponding to the first selected purpose for the terminal. The local storage means is operatively connected to the microcomputer means. Means for selectively controlling the local storage of the remotely transmitted information in the local storage means dependent on the selected purpose of the terminal are also provided with such local storage control means being operatively connectable to the microcomputer means to the selection means, and to the local storage means. The microcomputer means is operable in accordance with the locally stored remotely transmitted first one of a selected set of control instructions. Display means, such as a video display terminal or some other type of display device for data, such as a printer, is operatively connected to the microcomputer means with the microcomputer means selectively enabling either a direct display of the remotely transmitted displayable data or processing incoming data to the terminal in accordance with the locally stored remotely translated first one of the selected set of control instructions for providing a displayable processed output therefrom on the display means. The local storage selective control means enables local storage of a different one of the plurality of remotely transmitted sets of instructions in place of the first one of the locally stored selected remotely transmitted set of instructions in response to selection of a different selected purpose by the selection means with the microcomputer means operating differently with respect to the incoming data in accordance with the different locally stored set of instructions for the microcomputer means. Thus, a local down stream program loading or grabbing data display system for remotely transmitted information is provided.

Thus, the above described information retrieval system provides a selected purpose variable function terminal for information retrieval systems employing terminals that have local microcomputer control of the major functions of the local terminal by utilizing the instructions for the microcomputer which come from a remote data source as data so that the user of the system can request a particular function, that is set of instructions, for the microcomputer as well as being able to request certain data from this remote data source, these set of instructions comprising the program, either executive or application, for the microcomputer which then converts the terminal into a local selected purpose terminal, such as a computer processing terminal, a data retrieval or a communications terminal. As previously stated, this locally stored program may be replaced or modified by requesting a different program to select a different purpose for the terminal. Thereafter, depending on the selected purpose, the terminal will either operate on incoming transmitted data in accordance with the locally stored program, for example stock portfolio analysis or, for example, may comprise a local calculator in conjunction with locally provided keyboard data. To select a program, the user depresses a program number on a keyboard followed by the program key. This information is provided to the local microcomputer which sets up the correct search address bits. In normal fashion, the terminal raises an address compare line when a match is found to the incoming data. The permanently stored loader and executive program for the microcomputer is permanently stored in the read only memory or ROM, which, by controlling the microcomputer, stores the incoming information in the ramdom access memory or RAM as instruction sets to be executed, rather than as data, for the program selected. When the entire requested program has been loaded, the microcomputer turns control from the loader program to the newly entered called program which operates the terminal in accordance with the selected purpose. When it is desired to select a different program, the appropriate keys are again depressed and control is again returned to the loader and executive program which operates as previously described to load the newly requested program into the random access memory and then turn control of the microcomputer over to it. The information retrieval system for providing the down stream program grabbing or loading could be implemented either in a two way communication system or in a one way communication system, such as one employing row grabbing where the sets of instructions or programs as well as data are continuously transmitted from the remote data source.

BRIEF DESCRIPTION OF DRAWINGS

FIG. 1 is a block diagram of the preferred embodiment of the selected purpose variable function terminal in accordance with the present invention;

FIG. 2 is a diagrammatic illustration of a typical pseudo video scan line format in accordance with the present invention;

FIG. 3 is a diagrammatic illustration of a different typical pseudo video scan line format in accordance with the present invention; and FIG. 4 in a block diagram, similar to FIG. 1, illustrating the various signals which may be present in a pseudo video display terminal in accordance with the present invention.

DETAILED DESCRIPTION OF THE PREFERRED EMBODIMENT

Referring now to the drawings in detail and initially to FIG. 1 thereof, a selected purpose variable function terminal, generally referred to by the reference numeral 100, in accordance with the presently preferred embodiment of the present invention is shown in an overall system block diagram. The system to be described in greater detail hereinafter may essentially be referred to as a program grabbing terminal as opposed to the row grabbing terminal described in my previous U.S. Pat. No. 3,889,054, issued June 10, 1975, or the frame grabbing terminal described in my previously issued U.S. Pat. No. 3,875,329, issued Apr. 1, 1975, both of which are assigned to the same assignee. Preferably, as will be described in greater detail hereinafter, the program grabbing terminal 100 of the present invention is preferably an improvement of the row grabbing terminal previously described in my previously issued U.S. Pat. No. 3,889,054, with the preferred pseudo video scan line format utilized with the row grabbing terminal of U.S. Pat. No. 3,889,054 being illustrated in FIG. 2. Furthermore, the program grabber terminal 100 of the present invention may also preferably be utilized in a further improved version of the improved row grabbing terminal described in my copending U.S. patent application entitled "Improved Row Grabbing System" and bearing U.S. Ser. No. 611,843, filed Sept. 10, 1975. However, it should be noted that the program grabbing terminal 100 of the present invention will preferably function in any type of local data receiving terminal that has local microcomputer control of the major functions of the terminal.

As shown and preferred in FIG. 1, the program grabbing or selected purpose variable function terminal 100 preferably comprises a keyboard 102, such as preferably one substantially identical to the keyboard described in my previously mentioned copending U.S. patent application entitled "Improved Row Grabbing System" except for the addition of a program function key, a conventional microcomputer 104, such as preferably an integrated circuit microcomputer, such as Motorola 800 or a Rockwell International PPS-4 system such as one comprising a Rockwell International 10660 CPU, Rockwell International 10696 I/O and Rockwell International 10432 ROM and RAM, the RAM or read only memory being given reference numeral 106 in FIG. 1 and the RAM or random access memory being given reference numeral 108 in FIG. I. The program grabbing terminal 100 I/O device preferably comprises a data terminal input buffer 110 which preferably function in the same manner as the input buffer portion of the row grabbing terminal described in my U.S. Pat. No. 3,889,054 the contents of which are hereby specifically incorporated by reference herein in their entirety, to recognize the incoming information and determine its nature. The program grabbing terminal 100 also preferably includes a conventional cathode ray tube display device 112 and conventional display control logic 114 therefore, both of which are preferably identical which that previously described with reference to the row grabbing terminal described in my previously issued U.S. Pat. No. 3,889,054 which was previously incorporated by reference herein, with the display control logic 114 preferably comprising conventional logic circuitry capable of executing any type of desired storable display function for cathode ray tube 112 in accordance with the controlled operation of the terminal 100. As will be described in greater detail hereinafter, the instructions for the microcomputer 104 come from a remote central data source 120 which preferably functions in the fashion described with reference to the row grabbing system of U.S. Pat. No. 3,889,054 to commonly provide continuously transmitted information to a plurality of video display terminals. Although the system of the present invention will be described with reference to a one way transmission system of the type described with reference to my row grabbing system of U.S. Pat. No. 3,889,054, it will of course be apparent to one of ordinary skill in the art that the program grabbing terminal 100 of the present invention could also readily be adapted for use in a two way communication system.

As previously mentioned, the program grabbing terminal 100 of the present invention preferably utilizes the instructions for the microcomputer 104 which come from remote central data source 120. This continuously transmitted information preferably comprises displayable input data as well as program data, so that the user of the program grabbing terminal 100 of the present invention can request a particular function, that is a particular set of instructions for the microcomputer 104, as well as being able to request certain data from the remote central data source 120, such as in the manner previously described in U.S. Pat. No. 3,889,054 with respect to the row grabbing of a displayable row of data. The microcomputer control for enabling the grabbing and display of a row of data is described in my copending patent application entitled "Improved Row Grabbing System", the contents of which are incorporated by reference herein in their entirety on pages 12 through 97 with reference to FIGS. 2, 4 through 14 and 19 through 28 of the application, and particularly on pages 34 through 69 with reference to FIGS. 24 and 26 through 28 of the application, including an illustrative microprocessor control program on pages 36 through 53 and 59 through 67 of the application. The set of instructions which can be requested for the microcomputer 104 preferably comprises a program for the microcomputer 104, such as that of preferably an executive program or an application program for the microcomputer 104 which then converts the terminal 100, which preferably normally functions in the manner described in either my copending U.S. patent application entitled "Improved Row Grabbing System" or in the manner described in my U.S. Pat. No. 3,889,054 as an ordinary row grabbing terminal, into a local selected purpose terminal, either general purpose or special purpose depending on the function selected, such as for example, converting the terminal 100 into a local computer processing terminal, a local data retrieval terminal, or a local communications terminal.

Preferably, the set of instructions comprising the retrievable program for microcomputer 104 is transmitted over the same media as the conventional displayable data and has the same format as this data. Thus, assuming the system 100 of the present invention is preferably utilized with the row grabbing system described in my copending U.S. patent application entitled "Improved Row Grabbing System" or the row grabbing system of U.S. Pat. No. 3,889,054, wherein the displayable data is continuously transmitted over cable, this information would preferably have a digital data scan line format comprising a pseudo video scan line. Such a typical signal, as was previously mentioned, is shown in FIG. 2, which signal represents the pseudo video scan line received by the program grabbing terminal 100 and transmitted from remote central data source 120. This signal, as previously described in U.S. Pat. No. 3,889,054 is preferably in reality a digital signal which looks like a conventional video scan line to the program grabbing terminal 100 receiver. As was described in U.S. Pat. No. 3,889,054, the pseudo video scan line 122 is preferably identical in format to a conventional video scan line; that is, it is consistent with FCC and EIA standards for a video scan line signal format. However, this pseudo scan line 122 actually contains a row of information, such as approximately between 11 and 13 actual television video scan lines of information with the transmission time for pseudo video scan line 122 being equal to the transmission time of a conventional TV video scan line, which is approximately 63 microseconds, and with such a pseudo video scan line 122 containing a displayable row of data. The difference in the content of such a pseudo video scan line 122 with respect to the transmission of a set of instructions or program for microcomputer 104 as opposed to displayable data shall be described in greater detail hereinafter. With respect to the pseudo video scan line 122, the horizontal sync and vertical sync portions are preferably identical to a conventional video signal as is the format for the horizontal sync and the vertical sync as well as the horizontal sync amplitude. The time and amplitude envelope of what would normally be the video region for a displayable row of data of the pseudo video scan line 122 is defined by areas B, C, D, E, and F in FIG. 2 and is preferably identical with the format for a conventional video scan line as is the three dimensional frequency envelope. Thus, all of the above mentioned standard conditions for a conventional video scan line signal are met by the pseudo scan line 122 provided to the program grabbing terminal 100 from remote central data source 120 and, accordingly, any equipment that can handle conventional video can handle a pseudo video scan line 122 which can thus be transmitted and received through a conventional television distribution system with conventional television equipment. The distribution of information in regions A through G of the pseudo video scan line 122, illustrated in FIG. 2, is as follows. Region A represents the horizontal sync signal which starts the timing for the program grabbing terminal 100 as was previously described with reference to the row grabbing terminal of my U.S. Pat. No. 3,889,054 and indicates the beginning of a pseudo video scan line from the beginning of the horizontal sweep for a conventional television scan line. Region B preferably represents the pseudo video scan line address which contains all the following information bit locations. It should be noted, that preferably a 1 is indicated by the presence of a pulse and a 0 is indicated by the absence of a pulse, such as illustrated in FIG. 2 in region F where 1-0-1 is illustrated. When the transmitted information is a set of instructions, that is a program for the microcomputer 104, region B contains the program number as opposed to the group, page and row number which occupy region B when a displayable row of data is transmitted. If desired, this region may also preferably contain permission information, which is a one bit position which is preferably a 1 when the user is being given authority to receive one or more selected programs. This may be accomplished by grouping the programs in which instance the programs will be given a group number for different sets of programs such as by application, in which instance region B will also contain the group number for the program or set of instructions from microcomputer 104 which has been selected. Region C is preferably a special character information region of seven bits which is preferably utilized to indicate that the information contained in pseudo video scan line 122 is a set of instructions or program as opposed to displayable data, this special character being termed the "program load character". If such a program load character is not present, then preferably the terminal 100 will know that the information being received is a displayable row of data. If desired, other special character information may be provided in region C for other optional functions for the terminal 100. Region D preferably contains 32 characters corresponding to the set of instructions or programs being transmitted in pseudo video scan line 122. If pseudo video scan line 122 contains a displayable row of data as opposed to a set of instructions or programs, then region B preferably contains 32 characters of displayable information in digital form. Preferably, by way of example, when the pseudo video scan line 122 contains a set of instructions or program, as indicated by the presence of the program load special character in region C, the 32 characters of region B are preferably, by way of example, arranged as follows: character 1 contains the extended memory or field select, character 2 contains the upper six bits of the stored address, character 3 contains the lower six bits of the stored address, character 4 contains the length of the packet or program load in words, character 5 contains the upper six bits of the first word, character 6 contains the lower six bits of the first word, character 7 contains the upper six bits of the second word, character 8 contains the lower six bits of the second word and so forth for a maximum of 14 words for this set of instructions, character 32 containing the lower six bits of the 14th word. Of course, if desired, the transmitted program or set of instructions may comprise several pseudo video scan lines with each pseudo video scan line comprising a portion of the set of instructions comprising the entire program. Region E preferably contains seven bits of error check information and preferably may represent the complement of the binary equivalent of the sum of all of the 1 bits present in regions B, C and D, or may be the error check described in my previously incorporated copending U.S. patent application entitled "Improved Row Grabbing System". Region F preferably contains the clock synchronizing burst or pulse train at the bit rate (the frequency preferably being equal to ½ the bit rate) and comprises a pulse train of ones and zeros for two character spaces or 14 bits. Region G is preferably the same as Region A and represents the horizontal sync signal. In the instance of a transmitted displayable row of data, as was described with reference to U.S. Pat. No. 3,889,054, the vertical sync is provided by generating a special sequence of horizontal sync pulses during the normal television blanking period, which is after approximately 246 horizontal sync pulses, which in the system of U.S. Pat. No. 3,889,054 is after approximately 20 pages have been transmitted. Therefore, 20 pages are transmitted before each vertical sync. The sync signal looks like a conventional sync composite sync signal with the vertical sync interval comprising approximately 9 normal horizontal sync pulse times. As was previously mentioned in U.S. Pat. No. 3,889,054, when pseudo video scan line 122 contains a displayable row of data as opposed to a set of instructions or program, region B contains group which is the section or chapter including a predetermined number, such as 1,000, of pages and is the most significant bit of the page address, page which represents one frame in a group; and row which occupies one character space which is preferably seven bits, and defines a portion of the page preferably containing approximately 11 to 13 scan lines which comprise one displayable character height. In such an instance, region B also preferably contains direct address information, which is the first transmitted bit preferably and is a 0 unless the direct address condition exists which is a control condition for a selected terminal informing the terminal to supersede the requested page. In addition, as described in U.S. Pat. No. 3,889,054, an emergency override condition which provides control information to all terminals to override all requests including a permission request, preferably occurs when the page and group information bit locations are 0, this condition preferably being utilized to display emergency information such as a civil defense warning when the terminal 100 comprises both a portion of a video display network as well as a local program grabbing or selected purpose variable function terminal.

As is described in my copending U.S. patent application entitled "Improved Row Grabbing System" owned by the same assignee, the format for the pseudo video scan line 122 may preferably be varied to that illustrated in FIG. 3. The pseudo video scan line 122a illustrated in FIG. 3, as described in my copending U.S. patent application entitled "Improved Row Grabbing System" is preferably utilized when the row grabbing system employs a start bit to provide timing and phase adjustment for the phase locked loop of the receiver terminal. In such an instance, region F which was previously described with reference to FIG. 2, is deleted since this region F previously contained the sync burst information which is not required for timing and phase adjustment in the improved row grabbing system described in my copending U.S. patent application and, instead, region H which contains color burst information and region J which contains one start bit are preferably inserted between regions A and B, with regions B, C, D and E being electronically shifted down in position to be adjacent region G, only being separated therefrom by region K, which region K merely represents the standard TV spacing for providing the back porch of the signal, the front porch of the signal being defined between region A and the leading edge of the start bit in region J. As described in my copending patent application, the color burst signal in region H preferably is the standard FCC eight cycle signal at 3.58 megahertz. Apart from this repositioning and deletion of certain regions of the pseudo video scan line of FIG. 2, the contents of regions A, B, C, D, E and G in FIG. 3. is identical with that previously described with reference to FIG. 2 with respect to the transmission of a displayable row of data as well as with respect to the transmission of a set of instructions or program, with the corresponding difference in contents for these regions having been previously described with reference to pseudo video scan 122 of FIG. 2.

Preferably, when a program or set of instructions is requested and received, this set of instructions is locally stored until erasure at the terminal 100 for locally controlling the functioning of the microcomputer 104. This program or set of instruction may be replaced or modified by requesting a different program to select a different purpose for the terminal 100. Thereafter, depending on the selected purpose, the terminal 100 will either operate on incoming transmitted data in accordance with the locally stored program, for example, stock portfolio analysis or, for example, may comprise a local calculator in conjunction with keyboard 102 provided data if this is the selected purpose for the terminal 100.

In order to select or grab or down stream load a program, the user depresses the appropriate program number on the keys as indicated by the path 124 in FIG. 1 followed by depression of the program function key on keyboard 102 indicated by path 126 in FIG. 1. This information is provided to the local microcomputer 104 which then eventually sets up the correct search address bits. This information is entered in a conventional address register 130 for subsequent comparison with the incoming data and program information transmitted from remote central data source 120. In normal fashion, the terminal 100 raises the address compare line 132 when a match is found to the incoming information from remote central data source 120. When a match is detected between the address register 130 and the incoming address, an examination is then made of the special character, located in region C of the pseudo video scan line 122 or 122a, to determine if there is a program load character present. When there is an address match and the special character is a program load character, a permanently stored loader and executive program for the microcomputer 104 which is preferably permanently stored in read only memory 106, causes the microcomputer 104 to store this incoming set of instructions in RAM or random access memory 108 as instruction sets to be executed rather than as data. When the entire requested program has been loaded into RAM 108, the microcomputer 104 turns control from the loader program permanently stored in ROM 106 to the newly called or requested program now stored in RAM 108 which then operates the terminal 100 in accordance with the selected purpose determined by the stored called or requested set of instructions. When it is desired to select a different program, the appropriate keys on keyboard 102 are again depressed. Control is then returned to the loader program which operates as described above to load the new requested or called program set of instructions into RAM 108 and then, once again, turn control of microcomputer from the permanently stored loader and executive program of ROM 106 to the then newly stored set of instructions in RAM 108. The ROM stored loader and executive program for microcomputer 104 is preferably a conventional program for controlling these functions of the microcomputer 104 to enable the selection and loading of requested or called programs to RAM 108 and subsequent control thereby while also enabling normal row grabbing for subsequent video display of grabbed rows in accordance with the manner described in my copending U.S. patent application entitled "Improved Row Grabbing System" when no program is selected by keyboard 102, the terminal 100 operating in normal fashion as a programming video display terminal in such an instance in accordance with the operation described in my copending U.S. patent application entitled "Improved Row Grabbing System". As was previously mentioned, this loader and executive program for the microcomputer 104 is permanently stored in ROM 106 with the requested or called program being stored in RAM 108 until erasure thereof. As was also previously mentioned, the program grabbing terminal 100 of the present invention could be implemented in a two way system or in the one way row grabbing system which has been described by way of example herein in which programs as well as data are continuously transmitted.

The data terminal input buffer 110 functions preferably in the same manner as described in the row grabbing system of U.S. Pat. No. 3,889,054 or my copending U.S. patent application entitled "Improved Row Grabbing System" to recognize the incoming information and determine if it is data or a special function such as a program indicated by the program load special character. The microcomputer 104 preferably controls the input buffer 110 operation. In addition, as was previously mentioned, the display control logic 114 preferably comprises conventional logic circuitry capable of executing any type of desired storable display function for cathode ray tube 112 in accordance with the requested stored RAM 108 program, the functioning of the logic being conventional as described in U.S. Pat. No. 3,889,054.

For purposes of completeness, although my copending U.S. patent application entitled "Improved Row Grabbing System" has been previously specifically incorporated by reference in its entirety herein, the portion thereof pertaining to the description of the microcomputer and keyboard system shall be summarized hereinafter. The programming language for programming the microcomputer 104 is preferably selected as the appropriate conventional programming language recommended by the manufacturer for the equipment utilized. Thus, if as preferred the microcomputer 104, read only memory 106, random access memory 108, and data terminal input buffer 110 are all preferably integrated circuit chips manufactured by Rockwell International, such as what is commonly available from Rockwell International as their PPS-4 MP system wherein the microcomputer chip 104 is a Rockwell International 10660 CPU, ROM 106 and RAM 108 are Rockwell International 10432 memory chips and I/O chip or data terminal input buffer 110 is a Rockwell International 10696, the programming language for the callable or retrievable programs from the remote central data source 120 as well as for the permanently stored loader and executive program in ROM 106 is preferably written in PPS-4 assembler language provided from Rockwell International. The various inputs and outputs to the microcomputer 104 which are all preferably conventionally routed through the I/O chip 110 for interfacing the system with the microcomputer 104, have been omitted from FIG. 1 for clarity; however, these instructions or signals as well as their function in the system for providing displayable rows of video information on CRT 112 is fully described in my copending U.S. patent application entitled "Improved Row Grabbing System" the contents of which were previously hereby specifically incorporated by reference herein in their entirety. Therefore, further recitation of such detailed description is not necessary with respect to the programming function of the terminal 100. Some of these functions which are described in greater detail in my copending U.S. patent application entitled "Improved Row Grabbing System" are illustratively shown in FIG. 4 which is a block diagram of the terminal keyboard and microcomputer input/output for video display row-by-row of pseudo video scan lines in the improved row grabbing terminal, the balance of the circuitry which is shown and described in greater detail in my aforementioned copending U.S. patent application being generally represented by the block 200 labeled "terminal" in FIG. 4 and with the microcomputer 104, ROM 106, RAM 108 and I/O data terminal input buffer 110 being contained in the block labeled "microprocessor". It should be noted that the data terminal input buffer 110 also preferably contains a conventional special character decoder in addition to the balance of the interface functions performed thereby so as to detect the presence of a special character as previously mentioned. In the instance of programming terminal 100 one of the functions of this special character decoder is to detect the presence of the program loader character. The various latching preferably occuring within the terminal 200 is described in my aforementioned copending U.S. patent application. As described in my copending U.S. patent application entitled "Improved Row Grabbing System", the keyboard entry line 125-126 for the microprocessor from keyboard 102 preferably comprises four lines which are set when a key is pressed and latched and are reset to the idle state only when a clear pulse is sent on line 202 from the microprocessor. The keys which can be set are numeric keys as well as special function keys such as group, page, program, print, up, back, call, these functions being described in my copending U.S. patent application with the exception of the program function which has been described above. As shown in FIG. 4, if a group key is depressed and preceded by a number, the terminal 200 will be informed of the new group via the group address and page address line GAD/PAD and LEN lines, with the page number reset to 0 in the system described in my copending U.S. patent application. In that system, if the group is not preceded by a number, the only action taken would be to release directed messages by setting and clearing the KAC line and to erase the screen via a pulse on the ERA line, all functions which change the group/page accomplishing this such as call, back, up and group. The detailed response of the microprocessor with respect to depression of these function keys is described in greater detail in my aforementioned copending U.S. patent application. The inputs from the terminal 200 to the microprocessor which are described in detail in my copending U.S. patent application entitled "Improved Row Grabbing System" are the row enable line REN, the row address read line RAR, the row address write line RAW, the special character line, and the permission line PER. The output to the keyboard is the clear or keyboard latch reset line 202 which is pulsed when a key has been completely processed so that the key will then be reset to the idle state. The outputs to the terminal 200 from the microprocessor as described in my copending U.S. patent application comprise the erase line which erases the CRT 112, the keyboard active line KAC which is set while a group/page number is being sent to the terminal 200 so that the terminal 200 will take no action on it until the number is completely received, the group address/page address line GAD/PAD which informs the terminal 200 of a new page to grab, the latch enable line LEN and the row length line RWL. A more detailed description of these functions is provided in my copending U.S. patent application entitled "Improved Row Grabbing System": which is specifically incorporated by reference herein. Similarly, the keyboard functions which are also described in detail in my copending U.S. patent application will not be repeated herein. Suffice it to say that the microprocessor which includes the microcomputer 104, ROM 106, RAM 108 and I/O interface 110 employs the microcomputer 104 to perform all data handling and execution of the permanently stored program in the ROM 106 or the called program stored in the RAM 108. The RAM 108 will preferably function to store either data when the terminal 100 is being utilized in the manner described in my copending U.S. patent application for row by row video display of row grabbed data which is continually updated or, when the terminal 100 is being utilized for program grabbing, as was previously mentioned, will store the set of instructions comprising the grabbed program in place of the storage of data. If it is desired to additionally store data in conjunction with called programs as well as the set of instructions for the program, additional RAMS may be provided. When the terminal 100 is utilized for the row grabbing video display function as opposed to the program function, the microcomputer 104 gets instructions from the ROM 106 step by step, such as "take data from input buffer 110 and put it in RAM 108" or "take data out of RAM 108 and provide it to input buffer 110". Similarly, when the terminal 100 is utilized for its program grabbing function, the microcomputer 104 gets instructions from RAM 108 which stores the called program, step by step, and functions in accordance therewith. As was previously mentioned, if additional RAMS are provided, one of these functions could be, if desired, to take data out of this additional RAM and provide it to the input buffer 110 for susbequent display on CRT 112, such as if an update function is desired for information which is being analyzed in accordance with the called up program stored in RAM 108, such as real time stock portfolio analysis.

Thus, by utilizing the program grabbing terminal in accordance with the present invention a video display terminal may be converted into a local selected purpose variable function terminal which can function in accordance with any requested called up program retrieved from a remote central source by requesting a particular function or set of instructions for the local microcomputer as well as being able to request certain data from the remote central data source for subsequent display or processing. As used throughout the specification, the various conventional components comprising the microprocessor configuration including the keyboard 102, the CPU or microcomputer 104, the ROM 106, the RAM 108 and the input buffer 110 are such as fully described in the Rockwell International PPS-4 Manual entitled "Rockwell International Microelectronics Division MOS/LSI Parallel Processing System [PPS]". Similarly, the various conventional components comprising the C.R.T. 112 and display control logic 114 are identical with those described with reference to FIGS. 3 through 13 and 18 of my previous U.S. Pat. No. 3,889,054 which describes the display control portion of the row grabbing terminal receiver in conjunction with the associated C.R.T. or video display device in columns 4 through 7 and 14 through 44 thereof.

What is claimed is:

1. An information retrieval system comprising a remote information source for remotely transmitting information in a predetermined format over a common predetermined transmission media; and a local variable selectable function terminal operatively connected to said remote information source via said common transmission media for selectably receiving said remotely transmitted information, said remote information source transmitted information comprising displayable data and a plurality of different sets of control instructions for said terminal, each of said sets of control instructions corresponding to a different selectable function for said terminal, said terminal comprising microcomputer means for controlling the operation thereof, said microcomputer means being operatively connected to said transmission media for receiving said remotely transmitted information, said sets of control instructions for said terminal comprising sets of control instructions for said microcomputer means, selection means operatively connected to said microcomputer means for variably selecting a first selectable function for said terminal from a plurality of different selectable functions for said terminal, local storage means for selectably retrievably locally storing either said remotely transmitted displayable data or a first one of said remotely transmitted selected set of control instructions for said microcomputer means corresponding to said first selected function for said terminal, said local storage means being operatively connected to said microcomputer means, means operatively connectable to said microcomputer means, to said selection means and to said local storage means for selectively controlling the local storage of said remotely transmitted information in said local storage means dependent on said selected function for said terminal, said microcomputer means being operable in accordance with said locally stored remotely transmitted first one of said selected set of control instructions, and display means operatively connected to said microcomputer means, said microcomputer means selectively enabling either a direct display of said remotely transmitted displayable data or processing incoming data to said terminal in accordance with said locally stored remotely transmitted first one of said selected set of control instructions for providing a displayable processed output therefrom on said display means, said local storage selective control means including means for enabling local storage in said local storage means of a different one of said plurality of remotely transmitted sets of instructions in place of said first one of said locally stored selected remotely transmitted selected set of instructions in response to selection of a different selected function by said selection means, said microcomputer means varying the manner in which said incoming data is processed dependent on which one of said different sets of instructions for said microcomputer means is locally stored, whereby a local downstream program grabbing and data display means for remotely transmitted information is provided.

2. A system in accordance with claim 1 wherein said terminal further comprises means operatively connected to said microcomputer means for locally providing said incoming data to said microcomputer means.

3. A system in accordance with claim 1 wherein said remotely transmitted displayable data comprises video displayable data and said display means comprises video display means.

4. A system in accordance with claim 1 wherein said local storage means comprises random access memory means.

5. A system in accordance with claim 4 wherein said local storage selective control means comprises read only memory means for controlling the loading of one of said selected remotely transmitted sets of instructions into said random access memory means and enabling subsequent control of said microcomputer means in accordance with said loaded locally stored selected one of said remotely transmitted sets of instructions in accordance with said selected one of said sets of instructions.

6. A system in accordance with claim 5 wherein said read only memory means network enables said direct display of said remotely transmitted displayable data.

7. A system in accordance with claim 1 wherein said local storage selective control means comprises read only memory means for controlling the loading of one of said selected remotely transmitted sets of instructions into said local storage means and enabling subsequent control of said microcomputer means in accordance with said loaded locally stored selected one of said remotely transmitted sets of instructions in accordance with said selected one of said sets of instructions.

8. A system in accordance with claim 7 wherein said read only memory means network enables said direct display of said remotely transmitted displayable data.

9. A system in accordance with claim 3 wherein said remotely transmitted information comprises continuously transmittable information, said system further comprising a real time frame grabbing system for substantially instantaneously providing a continuous direct video display of a selectable predetermined video frame of information on said video display means from said continuously transmittable video displayable data information, said remote information source comprising means for transmitting said video displayable data information as a first plurality of pseudo video scan lines, each of said first pseudo video scan lines having a television video scan line format and capable of comprising a first complete self-contained packet of digital information sufficient to provide an entire displayable row of video data characters, said first pseudo video scan line having an associated transmission time equivalent to said television video scan line, said first packet of digital information comprising at least address information for said displayable row and data information for said displayable characters in said displayable row, said first pseudo video scan line being a composite video signal, said system further comprising television signal distribution means for distributing said transmitted composite first pseudo video scan line signals to said video display means for providing said continuous video display, said common transmission media comprising said television signal distribution means.

10. A system in accordance with claim 9 wherein said remote transmitting means further comprises means for transmitting said sets of instructions as second pseudo video scan lines each of which has said television video scan line format and capable of comprising a second self-contained packet of digital information sufficient to provide at least a portion of one of said sets of instructions, said second pseudo video scan line having an associated transmission time equivalent to said television video scan line, said second packet of digital information comprising at least address information for said one set of instructions and data information for said instructions comprising said one set thereof, and said terminal means further comprises interface means operatively connected between said transmission media and said microcomputer means for receiving said transmitted information, said television signal distribution means distributing said transmitted second pseudo video scan line signals to said interface means for enabling said local storage of said selected one of said sets of instructions.

11. A system in accordance with claim 10 wherein each of said first and second pseudo video scan lines further comprises a horizontal sync signal at the beginning thereof, said horizontal sync signal providing a record separator between adjacent first and second pseudo video scan lines.

12. A system in accordance with claim 9 wherein said transmitting means further comprises means for providing a vertical sync signal after a predetermined plurality of said first pseudo video scan lines have been transmitted.

13. A system in accordance with claim 9 wherein said microcomputer means further comprises means operatively connected between said television signal distribution means and said video display means for processing said distributed composite first pseudo video scan line signals and capable or providing a displayable video row signal to said video display means from each of said first pseudo video scan line signals pertaining to said selected frame for providing said continuous video display, a predetermined plurality of displayable video rows comprising a displayable video frame of information.

14. A system in accordance with claim 13 wherein said processing means comprises means for updating said continuously video displayable selectable frame on a displayable video row-by-row basis dependent on real time data information content of said received first pseudo video scan lines.

15. A system in accordance with claim 11 wherein said first and second pseudo video scan line signals provided by said transmitting means each comprise a three level signal having first, second and third signal levels with said first and second packets of digital information varying between said second and third signal levels and said horizontal sync signal information being provided between said first and second signal levels.

16. A system in accordance with claim 10 wherein said local storage control means further comprises means for testing said address information portion of each of said distributed first and second pseudo video scan line signals for satisfaction of at least one predetermined signal reception condition, said address information testing means providing a first predetermined output condition to said microcomputer means when said reception condition is satisfied, said data information for said video display thereof comprised in said first pseudo video scan lines corresponding to a first category and said data information for said instructions comprised in said second pseudo video scan lines corresponding to a second category, said each of first and second pseudo video scan lines packets of digital information further comprising a category identifier code portion containing a category condition, said first and second categories having different category conditions, said testing means further comprising means for testing said category identifier code portion of each of said distributed first and second pseudo video scan line signals for the content of said category condition, said category identifier code testing means providing a second predetermined output condition to said microcomputer means corresponding to said category condition content, said microcomputer means loading said local storage means with said second pseudo video scan line data information for said instructions when both said first predetermined output condition and said second predetermined output condition corresponding to said second category condition is provided thereto.

17. A system in accordance with claim 16 wherein said local storage control means further comprises means for inhibiting the local storage of said data information for said instructions in said local storage means when said signal reception condition and said second category condition are not satisfied.

18. A system in accordance with claim 17 wherein said microcomputer means loads said local storage means with said first pseudo video scan line video data information when both said first predetermined output condition and said second predetermined output condition corresponding to said first category condition is provided thereto and said inhibiting means inhibits the local storage of said video data portion in said local storage means when said signal reception condition and said first category condition are not satisfied.

19. A system in accordance with claim 17 wherein said selection means comprises keyboard means for selecting said set of instructions corresponding to each of said selectable functions for said terminal, said second packet address information comprising information corresponding to a particular terminal function associated with said distributed second pseudo video scan line set of instructions, said address information testing means comprising means for testing said terminal function information, said reception condition being correspondence between said terminal function information and said selected function.

20. A system in accordance with claim 19 wherein said keyboard means further comprises means for selecting said predetermined video frame to be continuously displayed, said first packet address information comprising information corresponding to the frame associated with said distributed first pseudo video scan line, said address information testing means further comprising means for testing said frame information, said reception condition being correspondence between said frame information and said selected frame.

21. A system in accordance with claim 9 wherein said microcomputer means further comprises means for updating said continuously video displayable selectable frame on a displayable video row-by-row basis dependent on the real time data information content of said received first pseudo video scan lines.

* * * * *

UNITED STATES PATENT OFFICE
CERTIFICATE OF CORRECTION

Patent No. 4,064,490      Dated December 20, 1977

Inventor(s) Robert H. Nagel

It is certified that error appears in the above-identified patent and that said Letters Patent are hereby corrected as shown below:

Title page, left side: After "[76] Inventor: Robert H. Nagel," change "10 Dubon Court, New York, New York 11735" to --New York, N.Y.--; same page after "[76] Inventor: Robert H. Nagel, 10 Dubon Court, New York, New York 11735" insert -- [73] Assignee: IDR, Inc., Farmingdale, New York --.

Signed and Sealed this

Twenty-first Day of November 1978

[SEAL]

Attest:

RUTH C. MASON
Attesting Officer

DONALD W. BANNER
Commissioner of Patents and Trademarks